(12) United States Patent
Bobbitt et al.

(10) Patent No.: US 10,169,661 B2
(45) Date of Patent: Jan. 1, 2019

(54) FILTERING METHODS FOR VISUAL OBJECT DETECTION

(71) Applicant: International Business Machines Corporation, Armonk, NY (US)

(72) Inventors: Russell P. Bobbitt, Yonkers, NY (US); Lisa M. Brown, Pleasantville, NY (US); Rogerio S. Feris, Hartford, CT (US); Sharathchandra U. Pankanti, Darien, CT (US); Yun Zhai, Pound Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 14/665,687

(22) Filed: Mar. 23, 2015

(65) Prior Publication Data

US 2015/0278631 A1    Oct. 1, 2015

Related U.S. Application Data

(60) Provisional application No. 61/971,677, filed on Mar. 28, 2014.

(51) Int. Cl.
*G06K 9/00* (2006.01)
*G06K 9/46* (2006.01)

(52) U.S. Cl.
CPC ....... *G06K 9/00771* (2013.01); *G06K 9/4614* (2013.01); *G06K 9/4652* (2013.01); *G06K 2209/21* (2013.01)

(58) Field of Classification Search
CPC ............ G06K 2209/21; G06K 9/4614
See application file for complete search history.

(56) References Cited

U.S. PATENT DOCUMENTS 8,159,538 B2 *  4/2012  Konishi ................ H04N 5/232
                                                        348/159
8,391,612 B2 *  3/2013  Natroshvili ............ G06T 7/0085
                                                        382/103

(Continued)

FOREIGN PATENT DOCUMENTS

WO    2012148258 A1    11/2012
WO    2013125768 A1     8/2013

OTHER PUBLICATIONS

Bobbitt, R., et al. U.S. Appl. No. 61/971,677, filed Mar. 28, 2014.
(Continued)

*Primary Examiner* — Gandhi Thirugnanam
(74) *Attorney, Agent, or Firm* — William H. Hartwell

(57) ABSTRACT

Machine logic that pre-processes and post-processes images for visual object detection by performing the following steps: receiving a set of image(s); filtering the set of image(s) using a set of multimodal integral filter(s), thereby removing at least a portion of the set of image(s) and resulting in a filtered set of image(s); performing object detection on the filtered set of image(s) to generate a set of object-detected image(s); assembling a first plurality of object-detected image(s) from the set of object-detected image(s); and upon assembling the first plurality of object-detected image(s), performing non-maximum suppression on the assembled first plurality of object-detected image(s).

19 Claims, 9 Drawing Sheets

(56) References Cited

U.S. PATENT DOCUMENTS

| | | | | |
|---|---|---|---|---|
| 8,559,671 | B2* | 10/2013 | Milanfar | G06K 9/00335 382/103 |
| 2002/0102024 | A1* | 8/2002 | Jones | G06K 9/6256 382/225 |
| 2004/0151371 | A1* | 8/2004 | Chen | G06K 9/00248 382/165 |
| 2004/0161134 | A1* | 8/2004 | Kawato | G06K 9/00228 382/118 |
| 2004/0179719 | A1* | 9/2004 | Chen | G06K 9/00234 382/118 |
| 2007/0154067 | A1* | 7/2007 | Laumeyer | G06K 9/00818 382/103 |
| 2008/0037838 | A1* | 2/2008 | Ianculescu | G06K 9/00228 382/118 |
| 2009/0003652 | A1* | 1/2009 | Steinberg | G06K 9/00228 382/103 |
| 2009/0060346 | A1* | 3/2009 | Guerzhoy | G06K 9/3208 382/197 |
| 2010/0053362 | A1* | 3/2010 | Nanu | G06K 9/00248 348/222.1 |
| 2010/0322534 | A1* | 12/2010 | Bolme | G06K 9/746 382/278 |
| 2011/0150332 | A1* | 6/2011 | Sibiryakov | G06T 5/004 382/167 |
| 2012/0057640 | A1* | 3/2012 | Shi | H04N 19/52 375/240.26 |
| 2012/0093364 | A1* | 4/2012 | Sato | G06T 7/208 382/103 |
| 2012/0120283 | A1* | 5/2012 | Capata | G06K 9/00255 348/241 |
| 2012/0134534 | A1* | 5/2012 | Lee | G06K 9/00973 382/103 |
| 2013/0004018 | A1* | 1/2013 | Kim | G06K 9/00375 382/103 |
| 2013/0182905 | A1* | 7/2013 | Myers | H04N 7/18 382/103 |
| 2015/0278631 | A1* | 10/2015 | Bobbitt | G06K 9/4652 382/103 |
| 2016/0005176 | A1* | 1/2016 | Nguyen | G06F 3/013 382/103 |

OTHER PUBLICATIONS

Dalal, N. "Finding People in Images and Videos". Institut National Polytechnique De Grenoble, These, Specialite: Imagerie, Vision et Robotique, Jul. 17, 2006. Projet Lear, Inria Rone-Alpes, Saint Ismier, France.

Dollar, P., et al. "Integral Channel Features". Copyright 2009.

Elgammal, A., et al, "Background and Foreground Modeling Using Nonparametric Kernel Density Estimation for Visual Surveillance" Proceedings of the IEEE, vol. 90 No. 7. pp. 1151-1163.

Felzenszwalb, P., et al. "A Discriminatively Trained, Multiscale, Deformable Part Model". Based upon the work supported by the National Science Foundation under Grant No. 0534820 and 0535174. Published in IEEE Conference on Computer Vision and Pattern Recognition, 2008, CVPR. pp. 1-8.

Kumar P., et al, "Addressing Uncertainty in Multi-Modal Fusion for Improved Object Detection in Dynamic Environment". Information Fusion vol. 11 (2010). pp. 311-324.

Rujikietgumjorn, S., et al. "Optimized Pedestrian Detection for Multiple and Occluded People". 2013 IEEE Conference on Computer Vision and Pattern Recognition. pp. 3690-3697.

Scherbaum, K., et al. "Fast Face Detector Training Using Tailored Views". 2013 IEEE International Conference on Computer Vision. pp. 2848-2855.

Viola, P., et al. "Robust Real-Time Face Detection". International Journal of Computer Vision 57(2), pp. 137-154, 2004. Copyright 2004 Kluwer Academic Publishers.

YouTube "Fighting terrorism in New York City". <http://www.youtube.com/watch?v=Nf_PzCfpPug> (from minute 7:20 to 9:20).

* cited by examiner

FILTERING METHODS FOR VISUAL OBJECT DETECTION

BACKGROUND

The present invention relates generally to the field of computer vision, and more particularly to visual object detection within images.

Computer vision—the field of using computers for vision perception purposes—is known. Computer vision includes methods for acquiring, processing, analyzing, and understanding images in order to produce numerical or symbolic information. Visual object detection (or "object detection") is a known sub-domain of computer vision that involves finding and identifying objects in digital images and/or videos (for a further definition of "object detection," see the Definitions sub-section of the Detailed Description section, below).

In the field of computer vision, an approach called Non-Maximum Suppression (NMS) is employed. Generally speaking, NMS is an edge thinning technique used to remove unwanted data on the edge of an image. NMS is commonly used in object detection to eliminate repeated detections of an object.

Another approach to optimizing computer vision is the use of integral images (also sometimes referred to as "summed area tables"). Generally speaking, an integral image computes, for each pixel in an image, a value equal to the sum of all pixel values above and to the left of the respective pixel, including the pixel itself. Because an integral image is determined from values above and to the left of each pixel, integral images can be computed in a single pass-through of an image.

SUMMARY

According to an aspect of the present invention, there is a method, computer program product and/or system that performs the following steps (not necessarily in the following order): (i) receiving a set of image(s); (ii) filtering the set of image(s) using a set of multimodal integral filter(s), thereby removing at least a portion of the set of image(s) and resulting in a filtered set of image(s); and (iii) performing object detection on the filtered set of image(s) to generate a set of object-detected image(s).

According to another aspect of the present invention, there is a method, computer program product and/or system that performs the following steps (not necessarily in the following order): (i) collecting a set of object-detected image(s) over a period of time, where each object-detected image in the set includes a set of object(s) that has previously been detected in the respective object-detected image; (ii) assembling a first plurality of object-detected image(s) from the set of object-detected image(s); and (iii) upon assembling the first plurality of object-detected image(s), performing non-maximum suppression on the assembled first plurality of object-detected image(s).

According to yet another aspect of the present invention, there is a method, computer program product and/or system that performs the following steps (not necessarily in the following order): (i) receiving a set of image(s), where the set of image(s) includes surveillance output collected over a period of time from one or more surveillance devices; (ii) filtering the set of image(s) using a set of multimodal integral filter(s) and a set of face-like background filter(s), thereby removing at least a portion of the set of image(s) and resulting in a filtered set of image(s); (iii) performing object detection on the filtered set of image(s) to generate a set of object-detected image(s); (iv) assembling a first plurality of object-detected image(s) from the set of object-detected image(s); and (v) upon assembling the first plurality of object-detected image(s), performing non-maximum suppression on the assembled first plurality of object-detected image(s). The filtering of the set of image(s) using a set of multimodal integral filter(s) includes computing integral images for one or more image modalities, and the computed integral images include at least one of the following: an integral image of normalized color channels; an integral image of background subtraction around a face; an integral image of contextual background subtraction around a torso; and an integral image of squared intensities.

DETAILED DESCRIPTION

Figure 1:
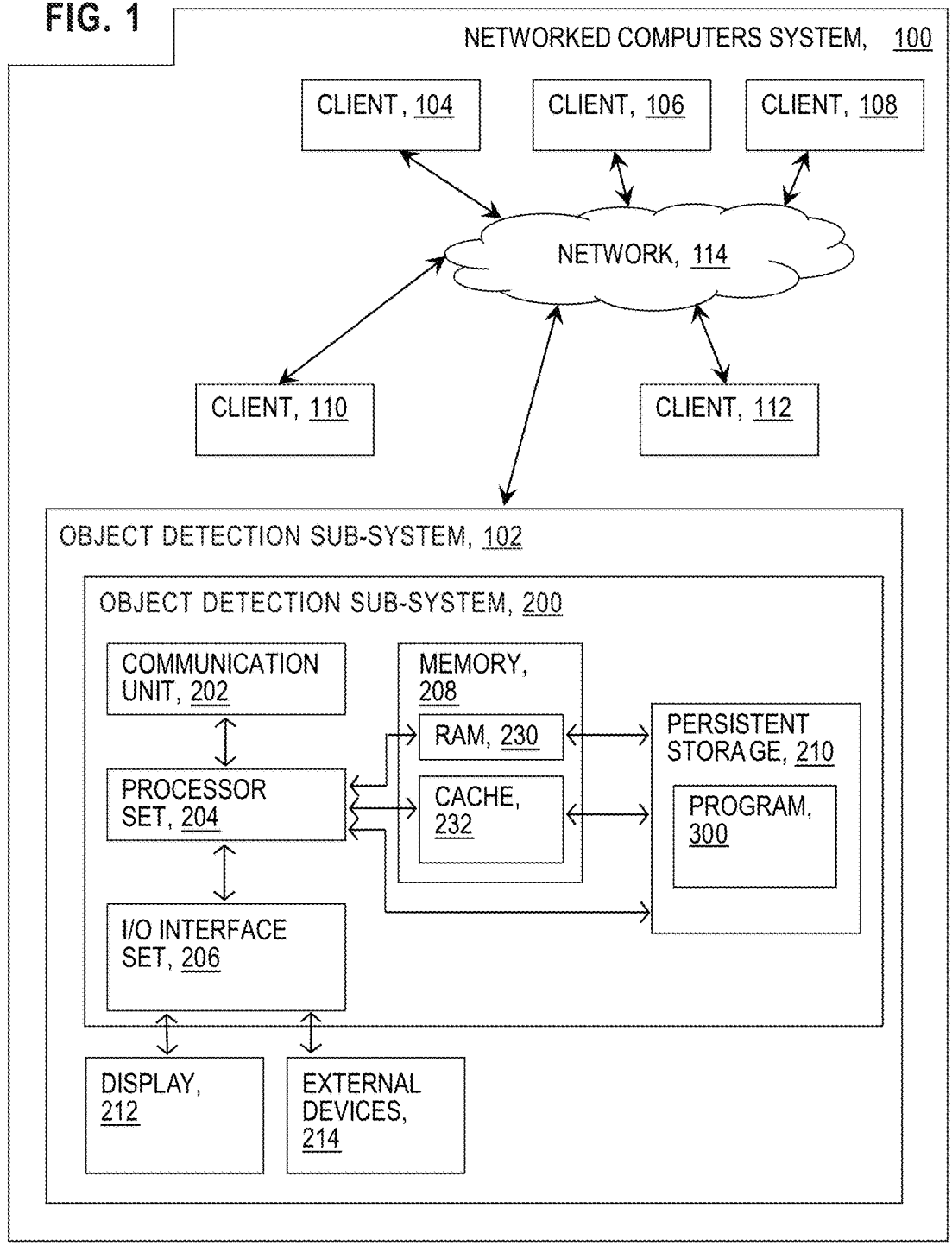
FIG. 1 is a block diagram view of a first embodiment of a system according to the present invention.

Embodiments of the present invention provide pre-process images for visual object detection by applying multimodal integral filters to rapidly remove irrelevant portions, thereby improving the accuracy and efficiency of the object detection process. Furthermore, after object detection, embodiments of the present invention perform temporal non maximum suppression on multiple object-detected images or video frames in order to reduce duplicate detections while minimizing false positive duplicate removals. This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for the present invention will now be described in detail with reference to the Figures. FIG. 1 is a functional block diagram illustrating various portions of networked computers system 100, including: object detection sub-system 102; client sub-systems 104, 106, 108, 110, 112; communication network 114; object detection computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 and computer 200 are shown as block diagrams with many double arrows. These double arrows (no separate reference numerals) represent a communications fabric, which provides communications between various components of sub-system 102 and computer 200. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 2:
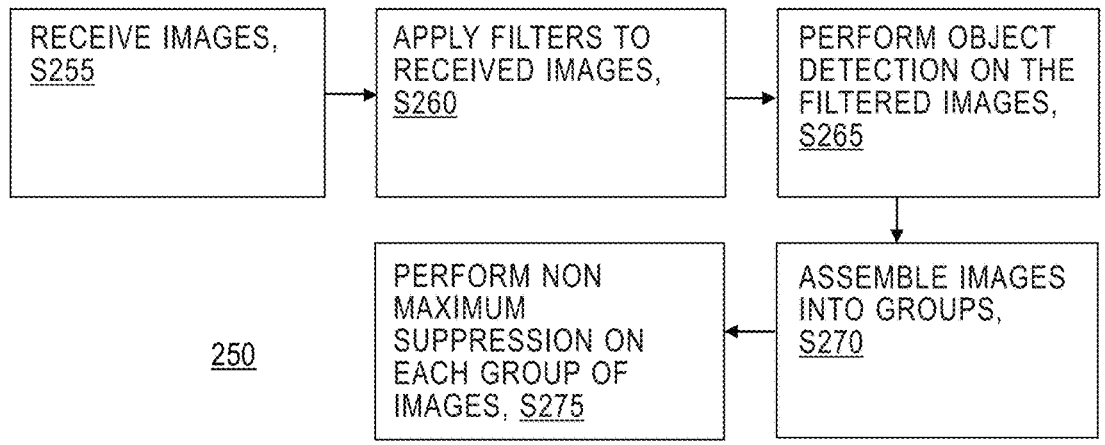
FIG. 2 is a flowchart showing a first embodiment method performed, at least in part, by the first embodiment system.
Figure 3:
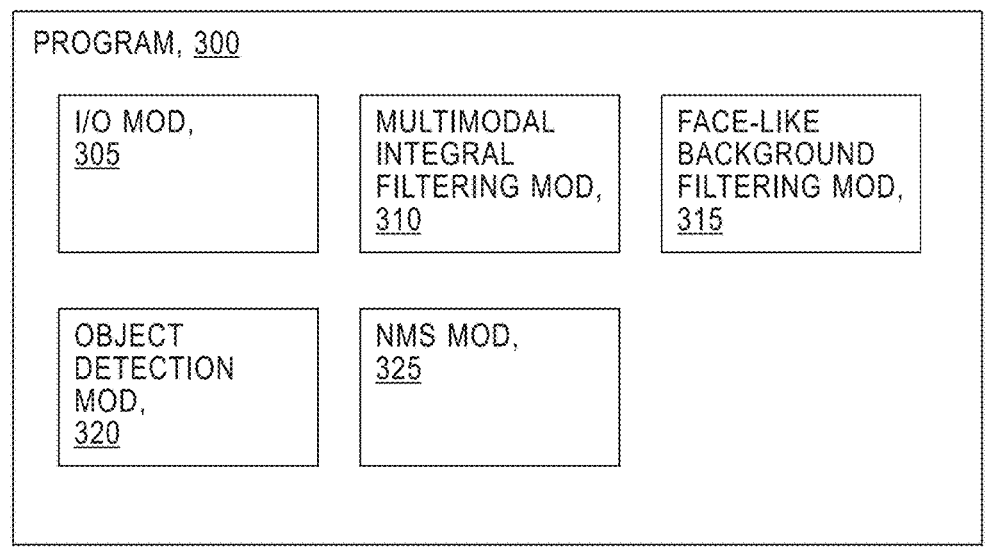
FIG. 3 is a block diagram showing a machine logic portion of the first embodiment system.

FIG. 2 shows flowchart 250 depicting a method (sometimes referred to as method 250) according to the present invention. FIG. 3 shows program 300 for performing at least some of the method steps of flowchart 250. This method and associated processing modules will now be discussed, over the course of the following paragraphs, with extensive reference to FIG. 2 (for the method step blocks) and FIG. 3 (for the processing blocks). In this example embodiment (referred to in this sub-section as the "present example," the "present example embodiment," "the present embodiment," and the like), object detection computer 200 is adapted to detect "objects" that are human beings (that is, object detection computer 200 detects humans within images), although the invention may be implemented to detect any detectable objects within images.

Figure 4A:
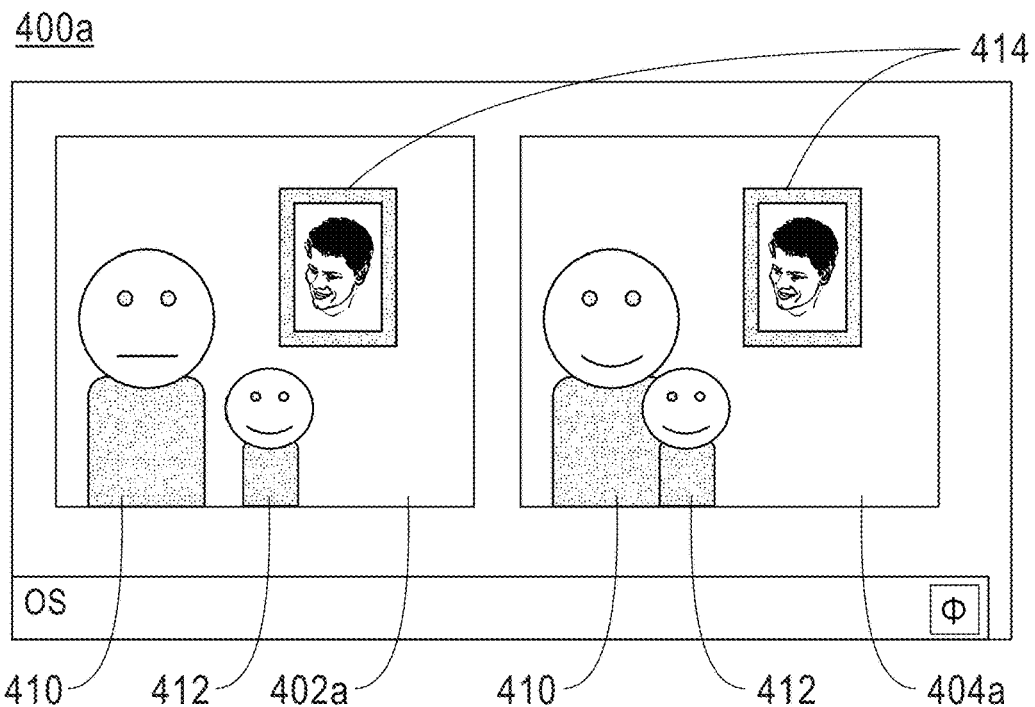
FIG. 4A is a screenshot view generated by the first embodiment system.

Processing begins at step S255, where I/O module ("mod") 305 receives a set of images to be processed for object detection. In the present embodiment, exactly two images are received by I/O mod 305. However, in other embodiments, any number of images may be received. In many embodiments (including embodiments discussed below in the Further Comments and/or Embodiments sub-section of this Detailed Description), the received images include surveillance output from one or more surveillance devices (for a definition of "surveillance output", see the Definitions sub-section of this Detailed Description). In many of these embodiments, the received images represent successive moments in time (for example, surveillance camera footage, where a new image is generated every fifteen seconds). However, this is not meant to be limiting, and method 250 may be used to process any number of a wide variety of images, regardless of their source. In the present embodiment, for example, the two images are received from a portable computer-readable storage medium that was previously located in (and stored images generated by) a digital camera. Screenshot 400a (see FIG. 4A) depicts these two images (image 402a and image 404a) on computer display 212 (see FIG. 1). As shown in FIG. 4A, both image 402a and image 404a include the same items in their field of view: (i) person 410 (named "Watson"); (ii) person 412 (named "Tommy"); and (iii) framed picture 414. Additionally, as shown in FIG. 4A, the primary differences between image 402a and image 404a are: (i) in image 404a, Tommy 412 and Watson 410 are standing closer to each other than in image 402a; (ii) Watson 410 is smiling in image 404a, but not in image 402a; and (iii) from the perspective of the camera (or viewer), in image 404a Tommy 412 appears to be standing slightly in front of and is therefore slightly overlapping Watson 410.

Processing proceeds to step S260, where multimodal integral filtering mod 310 and/or face-like background filtering mod 315 apply filters to the received images. More specifically, multimodal integral filtering mod 310 and face-like background filtering mod 315 filter the set of images by removing at least a portion of the images, resulting in a filtered set of images. It should be noted that although filters are referred to herein as being applied to entire images, many filters according to the present invention affect only portions of images. For example, in some embodiments, the filtering of step S260 includes identifying candidate image regions within the received images, where the candidate image regions are then filtered by multimodal integral filtering mod 310 and/or face-like background filtering mod 315. In one specific embodiment, where a single image depicting a face and a purple sofa is provided, the candidate image regions around the purple sofa are quickly filtered out as not having a known skin color. Furthermore, in some embodiments, large sets of candidate image regions are initially identified, and multimodal integral filtering mod 310 and face-like background filtering mod 315 quickly determine which candidate image regions to filter and which candidate image regions to discard. For additional discussion of candidate image regions (also referred to as "candidate windows" and "candidate portions"), see the Further Comments and/or Embodiments sub-section of this Detailed Description.

As mentioned above, in the present embodiment, object detection computer 200 (via method 250) is adapted to detect human beings in the set of image(s). As such, the filters of the present example are meant to remove portions of the images that are determined—with a relative degree of certainty—not to be human. When applied to images 402a and 404a, face-like background filtering mod 315 determines that framed picture 414 (and its corresponding candidate image region) is not a person (even though it may look like a person). In this example, face-like background filtering mod 315 removes framed picture 414 from image 402a and image 404a, resulting in filtered image 402b and filtered image 404b, depicted in screenshot 400b (see FIG. 4B).

It should be noted that although object detection computer 200 of the present embodiment is adapted to detect individual human beings, in other embodiments that may not be the case. In fact, object detection computer 200 may be adapted to detect any object that is detectable via object detection. For some examples of detectable objects, see the definition of "object detection" in the Definitions sub-section of this Detailed Description.

Multimodal integral filtering mod 310 filters the received images via multimodal integral filters. As used herein, a multimodal integral filter quickly filters an image based on one or more computed integral image(s), where integral images (see the Background section) are based on one or more filtering characteristics (also referred to as "modalities"). For example, in some cases it may be desirable to remove the background from an image in order to better detect objects in the image's foreground. As such, one filtering characteristic could be simply to remove any portion of an image that is in the background. The integral image corresponding to this filtering characteristic (which could be called a "background subtraction modality") would be able to detect background features (and could be called an "integral image of background subtraction"), and the corresponding filter would be adapted to remove any detected background features (and could be called a "foreground filter"). Other examples of filters based on integral images include: (i) skin-color filters based on integral images of normalized color channels; (ii) contextual foreground filters based on integral images of contextual background selection; and/or (iii) variance filters based on integral images of squared intensities. For a detailed discussion of these filters, their corresponding integral images and modalities, and how they are applied to received images, see the Further Comments and/or Embodiments sub-section of this Detailed Description. Furthermore, for a general discussion of integral images, see the Background section and the Further Comments and/or Embodiments sub-section of this Detailed Description section. It should be noted that the utilization of integral images in multimodal integral filters allows filters of the present invention to filter received images in a way that is much faster than filtering methods known in the art.

Face-like background filtering mod 315 filters the received images via face-like background filters. As used herein, a face-like background filter detects face-like objects in the background of an image and filters the image by removing those objects. For example, when images are received from a surveillance video feed, face-like objects that remain the same from image-to-image are less likely to be actual faces and more likely to be objects that simply resemble faces. In the present embodiment, for example, face-like background filtering mod 315 compares image 402a and image 404a (see FIG. 4A) and determines that, because the positioning and features of framed picture 414 have not changed from image 402a to image 404a, framed picture 414 is not, in fact, a face (although it resembles a face) and instead is a face-like background object to be removed from the images. It should be noted that this example is used for explanatory purposes, and that in many embodiments face-like background filtering mod 315 will detect background objects in other, more complex ways. For example, in some embodiments, face-like background filtering mod 315 filters the received images by performing some (or all) of the following steps: (i) running a face detector at a sensitive threshold on background regions detected by background modeling; (ii) recording a number of detections for particular locations over a period of time; (iii) identifying locations with high numbers of detections of "face-like" background regions; and/or (iv) using detected "face-like" background regions to prune face detections that occur at the same location. For a detailed discussed of face-like background filters according to the present invention, see the Further Comments and/or Embodiments sub-section of this Detailed Description.

Figure 4B:
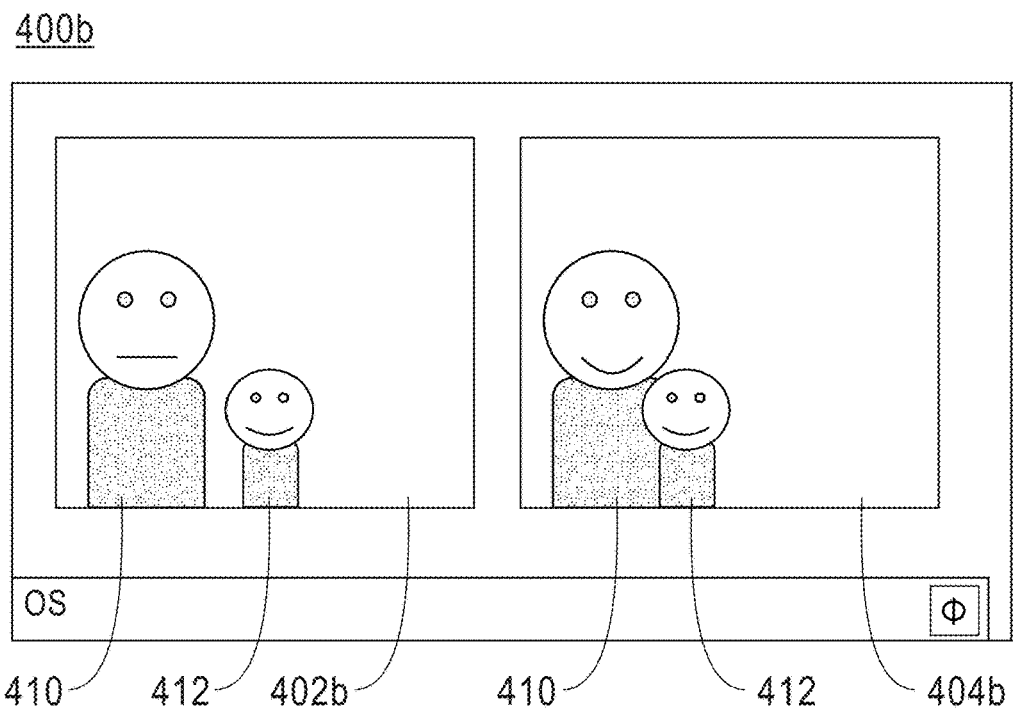
FIG. 4B is a screenshot view generated by the first embodiment system.
Figure 4C:
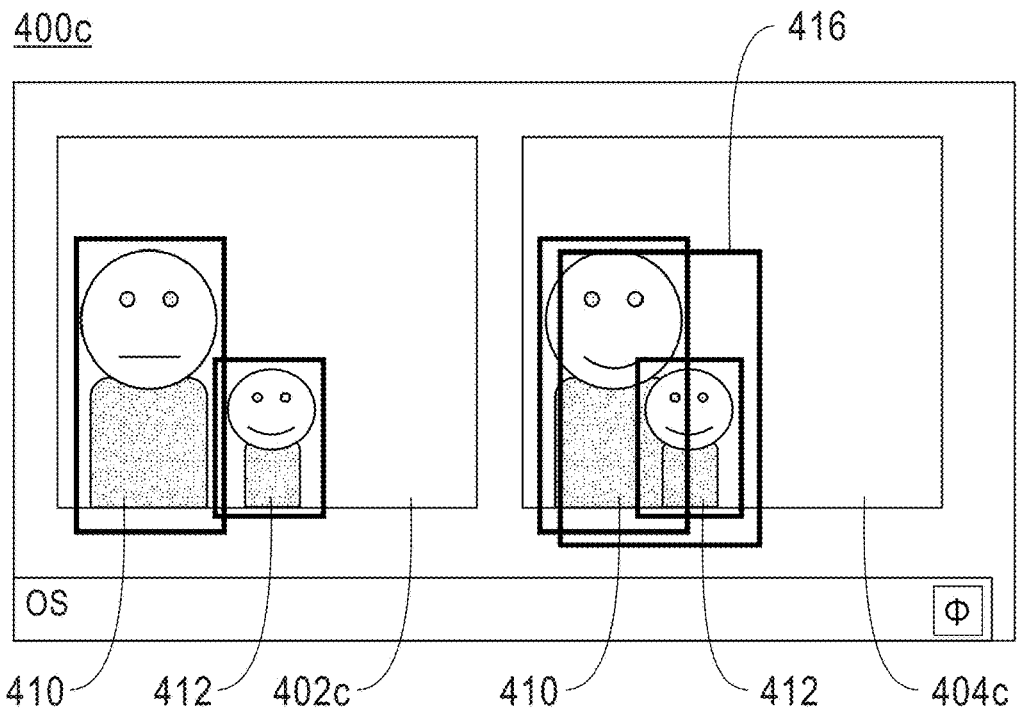
FIG. 4C is a screenshot view generated by the first embodiment system.

Processing proceeds to step S265, where object detection mod 320 performs object detection on the filtered set of images (such as images 402b and 404b in screenshot 400b) to generate a set of object-detected images (such as images 402c and 404c in screenshot 400c, see FIG. 4C). Stated another way, in this step, object detection computer 200 takes the filtered images and detects any objects present in them. In many embodiments, objects are detected from the previously identified candidate regions that have been filtered according to the previous step. Many object detection methods may be used, including, for example, discriminative detection methods. For a detailed discussion of object detection according to the present invention, see the Further Comments and/or Embodiments sub-section and the Definitions sub-section of this Detailed Description section.

In the present example embodiment, object detection mod 320 detects individual "human" objects for Watson 410 and Tommy 412 in image 402b (see FIG. 4B). The resulting detections are depicted in image 402c in screenshot 400c (see FIG. 4C), where rectangular boxes surrounding Watson 410 and Tommy 412 depict their corresponding detections. However, because Watson 410 and Tommy 412 are overlapping each other in image 404b (see FIG. 4B), object detection mod 320 has more difficulty identifying Watson 410 and Tommy 412 as separate objects in image 404b. Instead, object detection mod 320 identifies three objects: one for Watson 410, one for Tommy 412, and one that includes both Watson 410 and Tommy 412 (identified here as faulty detection 416), as shown in image 404c (see FIG. 4C). In this case, object detection mod 320 has incorrectly identified an additional object (faulty detection 416) in the image. Again, it should be noted that the present example is a simplified example used for explanation purposes, and in many embodiments the object detection process (including the objects that are being detected) is much more complex.

For example, in some embodiments, object detection mod 320 is adapted to detect individual faces, or, even more particularly, specific facial expressions. Again, for additional discussion of object detection according to the present invention, see the Further Comments and/or Embodiments sub-section and the Definitions sub-section of this Detailed Description section.

Processing proceeds to step S270, where non-maximum suppression (NMS) mod 325 (see FIG. 3) assembles the object-detected images (such as images 402c and 404c, see FIG. 4C) into groups (also referred to as "pluralities" of object-detected images) for non-maximum suppression (see the discussion of step S275, below). Stated another way, in this step, NMS mod 325 assembles the detections of each object over several images, where NMS will not be performed on each detection and will instead be performed on the assembled group of detections. In the present example embodiment, both image 402c and image 404c are added to the same group. However, this is not meant to be limiting, and assembled groups of object-detected images may include a wide variety of image quantities and/or configurations. In some embodiments, multiple groups are created, each with the same number of object-detected images. In other embodiments, the multiple groups have varying numbers of object-detected images. Furthermore, in some embodiments, the groups overlap, such that a single object-detected image may be included in more than one group. For example, in one embodiment (discussed in the Further Comments and/or Embodiments sub-section of this Detailed Description), groups of "n" images (also called "detections" and/or "bounding boxes") are assembled, where each group contains a new object-detected image along with n−1 object-detected images from the previous group.

Figure 4D:
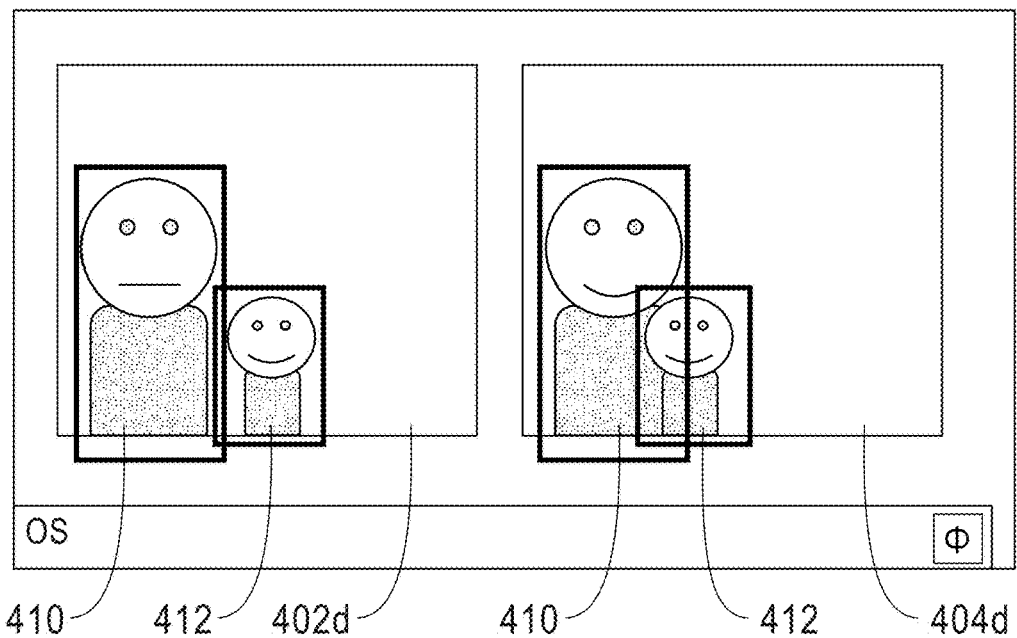
FIG. 4D is a screenshot view generated by the first embodiment system.

Processing proceeds to step S275, where NMS mod 325 performs non-maximum suppression (NMS) for each assembled group of object-detected images. As stated above in the Background section (and discussed in further detail in the Further Comments and/or Embodiments sub-section of this Detailed Description section), NMS is a procedure used to eliminate nearby duplicate detections of an object. The results of NMS in the present example embodiment are shown in FIG. 4D. In this example, NMS is performed on the group of image 402c and image 404c, resulting in images 402d and 404d (in screenshot 400d, see FIG. 4D), where Watson 410 and Tommy 412 are accurately identified as singular objects. As shown in FIG. 4D, NMS mod 325 was able to successfully eliminate faulty detection 416 (see FIG. 4C) covering both Watson 410 and Tommy 412. As will be explained in the following paragraph, this successful elimination of faulty detection 416 is based, at least in part, on the fact that NMS was performed on images 402c and 404c simultaneously as a group (and not individually). Additionally, as will also be discussed in the following paragraph, by performing NMS on a group of images, NMS mod 325 is able to detect objects in images that would have otherwise been missed by performing NMS on an image-by-image basis.

Figure 4E:
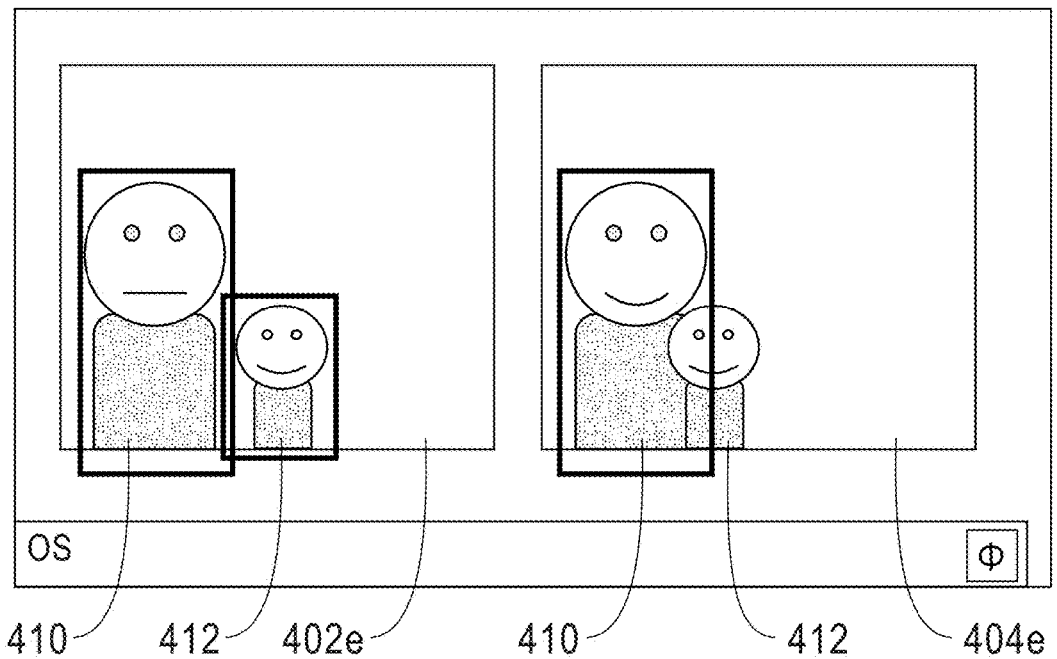
FIG. 4E is a screenshot view generated by the first embodiment system.

In order to maximize the efficacy of NMS, embodiments of the present invention perform NMS on assembled groups of object-detected images (for example, sets of consecutive video frames) instead of on individual object-detected images themselves. Using prior art approaches, when NMS was performed on an image-by-image basis, nearby detections of objects were suppressed, resulting in valid objects mistakenly not being detected. An example of this can be shown in screenshot 400e (see FIG. 4E). As shown in FIG. 4E, when NMS is applied to image 404c on its own, the NMS process mistakenly suppresses the detection of Tommy 412, due to the proximity of Tommy 412 to Watson 410. However, as shown in FIG. 4D, when NMS is applied to both image 402c and 404c at the same time, the NMS process identifies Tommy 412 from image 402c and correctly does not suppress the detection of Tommy 412 in image 404c.

Once all the assembled groups of object-detected images have completed the NMS process, processing for method 250 completes. In some embodiments, the resulting output is a modified set of the original received set of images (also referred to as "object-detected bounding boxes"), with the non-relevant portions filtered out and the desired objects detected (see images 402d and 404d). In other embodiments, however, only the relevant candidate image regions are produced as output. For example, in some embodiments, instead of outputting images 402d and 404d, object detection computer 200 simply outputs the candidate image regions including Watson 410 and Tommy 412 (depicted by the corresponding boxes in images 402d and 404d).

Although the present example embodiment and method 250 include a series of steps for both pre-processing (that is, filtering) and post-processing (that is, performing NMS) images for object detection, it should be noted that other embodiments of the present invention may simply include pre-processing or post-processing, but not both. For example, in one embodiment, the invention simply includes receiving (S255) the set of images, filtering (S260) the images using multimodal integral filtering mod 310 (and/or face-like background filtering mod 315), and then performing (S265) object detection, without any NMS-related post-processing. In another embodiment, the invention includes performing (S265) object detection (or receiving object-detected images), assembling (S270) the object-detected images into groups, and performing (S275) NMS on each group, without any filter-related pre-processing. Additional embodiments for pre-processing and post-processing object-detected images according to the present invention will be discussed below in the following sub-section.

III. FURTHER COMMENTS AND/OR EMBODIMENTS

Some embodiments of the present invention recognize the following facts, potential problems and/or potential areas for improvement with respect to the current state of the art: (i) existing non-maximum suppression (NMS) schemes are ineffective when a scene in a given image is too crowded (eliminating true detections, for example); (ii) existing large-scale object detection deployments are inefficient, requiring the testing of many regions within each image; and/or (iii) existing large-scale object detection deployments can be inaccurate and cause significant numbers of false alarms when motion and/or lighting changes in an image.

As hundreds or thousands of cameras are considered in visual object detection deployments, the tolerance for false alarms becomes more strict. In addition, systems need to be highly resource and cost efficient in order to process many video channels per server. In many cases, a face detector component is the bottleneck in this respect, as many image windows across different positions and scales need to be scanned to detect the presence of a face. As such, embodiments of the present invention provide pre-processing filtering methods for visual object detection in surveillance output to improve the accuracy and efficiency of visual object detectors (for a definition of "surveillance output", see the Definitions sub-section of this Detailed Description).

Generally, object detection is performed using a sliding window approach where a detector is applied at every position/scale of the surveillance output to check for the presence of an object (for example, a face). The pre-processing approach of the present invention enables more efficiency and more accuracy when compared to state-of-the-art methods.

An embodiment of the present invention uses filtering to perform rapid removal of (i) candidate windows that don't have sufficient foreground in the face or torso areas, (ii) non-skin color regions; and/or (iii) homogeneous regions.

Figure 5A:
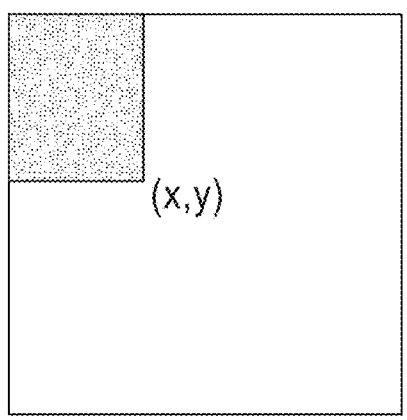
FIG. 5A is a diagram showing information that is helpful in understanding integral images utilized by embodiments of the present invention.
Figure 5B:
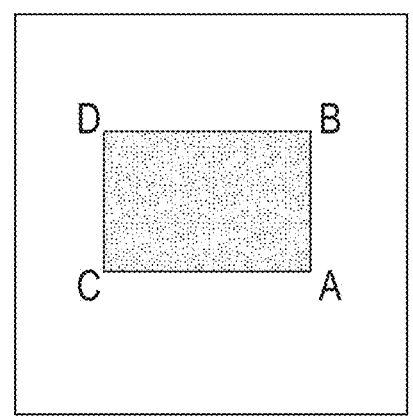
FIG. 5B is a diagram showing information that is helpful in understanding integral images utilized by embodiments of the present invention.

Some embodiments of the present invention utilize integral images. An integral image computes a summed value at each pixel in the image, where the summed value is the sum of all pixel values above and to the left of the respective pixel, including the pixel itself. Because the integral image is determined from values above and to the left of each pixel, the integral image can be computed in a single pass-through of the image. Diagram 510 (see FIG. 5A) depicts an integral image according to the present invention, where the highlighted portion is the area included in the summed value for the pixel located at coordinates (x,y). Furthermore, as depicted in diagram 520 (see FIG. 5B), the summed value for any rectangle within an image can be determined from the four points of the rectangle (labeled A, B, C, and D in diagram 520) by simply performing the following equation, where A, B, C, and D represent the summed values for their respective pixels:

Equation 1—Calculating the Summed Value of a Rectangle in an Integral Image $$\text{sum} = A - B - C + D$$

Figure 6A:
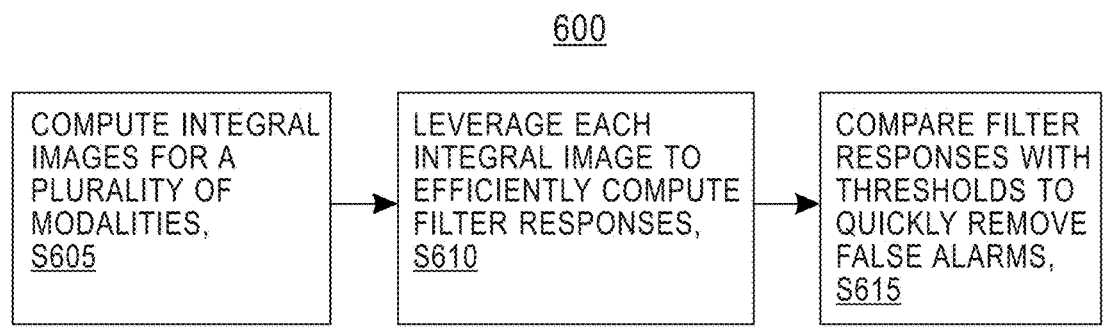
FIG. 6A is a flowchart showing a second embodiment method performed, at least in part, by a second embodiment system according to the present invention.
Figure 6B:
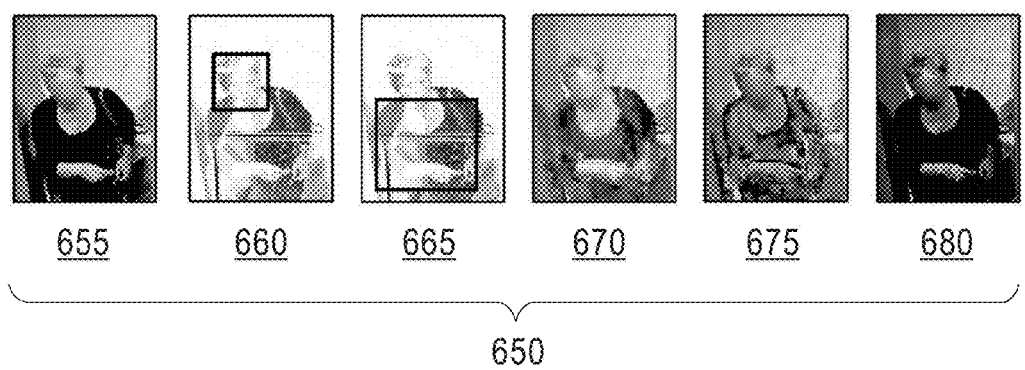
FIG. 6B is a diagram showing information that is generated, at least in part, by the second embodiment method.

Embodiments of the present invention utilize novel modalities and leverage easy-to-implement integral filters to rapidly eliminate background patches in a series of images and reduce the number of false positives. FIG. 6A shows flowchart 600 depicting a multimodal integral filtering process according to the present invention. FIG. 6B shows diagram 650 illustrating the multimodal integral filtering process as applied to an image, where the original image is shown in image 655 (see FIG. 6B). This method and associated diagram will now be discussed, over the course of the following paragraphs, with extensive reference to FIG. 6A (for the method step blocks) and FIG. 6B (for the results of the method steps).

Processing begins at step S605, where the filtering process computes integral images of a plurality of modalities. Examples of modalities include, but are not limited to: (i) foreground images; (ii) different color channels; and (iii) intensity images. A number of integral images according to the present embodiment correspond to images shown in FIG. 6B: (i) image 660 corresponds to an integral image of background subtraction (BGS) around a face; (ii) image 665 corresponds to an integral image of BGS (also referred to as "contextual BGS") around a torso; (iii) image 670 corresponds to an integral image of normalized R/R+G+B (where R, G, and B correspond to red, green, and blue channels of the input image, respectively); (iv) image 675 corresponds to an integral image of normalized B/R+G+B (again, where R, G, and B correspond to red, green, and blue channels of the input image, respectively); and (v) image 680 corresponds to an integral image of squared intensities, for fast computation of standard deviation.

Processing proceeds to step S610, where, for each modality, a filtering process uses multimodal integral filter(s) to leverage the integral images to efficiently compute measures called "filter responses." A wide variety of multimodal integral filters may be used in this process. Specifically, in the present embodiment: (i) image 660 is filtered by an integral foreground filter (where darker colors mean a higher foreground probability); (ii) image 665 is filtered by a contextual foreground filter; (iii) images 670 and 675 are filtered by a skin-color filter; and (iv) image 680 is filtered by an integral variance filter. Filter responses may include, for example, the average of pixels of that modality at a face-bounding box (see, for example, image 660), the average of pixels of that modality at a torso-bounding box (see, for example, image 665), and/or the standard deviation of the face and torso-bounding boxes (see, for example, image 680).

Processing proceeds to step S615, where the filtering process compares the filter responses with thresholds to quickly remove candidate image regions (or "hypotheses") and false alarms. Stated another way, in this step, the filtering process quickly eliminates many candidate image regions that do not correspond to the object being searched for. In this step, machine learning algorithms can be used to fuse the different responses.

The following paragraphs will now discuss the multi-modal integral filters referenced in step S610 (discussed above). These filters are used by embodiments in accordance with the present invention to filter images (such as image 655, see FIG. 6B) using the integral images computed in step S605 (also discussed above). Multimodal integral filters are defined in some embodiments by Equation 2, below, where $x^m$ is a particular pixel subwindow of image modality m (for example, a subwindow—or "candidate image region"—for which the present invention is verifying the presence of a face), where $I^m$ represents an integral image computed from image modality m, and where $R^n$ represents a real coordinate space of n dimensions. Equation 2 receives as input x with n real values (pixel values of a candidate image region) from modality m, producing a single output of a real number.
Equation 2—Multimodal Integral Filters (Generic)

$$F(x^m; I^m) = R^n \rightarrow R$$

Some embodiments of the present invention compute an integral image $I^{for}$ of the foreground image obtained by a background modeling algorithm. In some embodiments, the foreground filter (also referred to as the "integral foreground filter"), is defined by Equation 3, below, where k is the index of a particular pixel, and N is the total number of pixels for a given candidate image region. In short, Equation 3 sums all of the pixel values for a candidate image region and then divides by N to compute an average pixel value.

Foreground Filter $$F^{for}(x^{for}; I^{for}) = \sum_k^N x_k^{for} / N \qquad \text{Equation 3}$$

The integral foreground filter includes the average of foreground pixels along the face region (as shown in foreground image 660, see FIG. 6B, discussed above). Intuitively, an image subwindow should have enough foreground occupancy to be considered as a face. The average can be computed quickly using $I^{for}$ with only three additions and one division.

In addition to foreground occupancy along the face region, some embodiments of the present invention also measure foreground occupancy along the torso region (as shown in torso region image 665, see FIG. 6B, discussed above). One contextual foreground filter of these embodiments is defined as follows:
Equation 4—Contextual Foreground Filter $$F^{ctf}(x^{for}; I^{for}) = F^{for}(y^{for}; I^{for})$$

In Equation 4, $y^{for}$ is the torso pixel subwindow estimated from the position and size of the face subwindow $x^{for}$. The reasoning behind this filter is that face detections without enough foreground pixels in the torso area should be suppressed.

In order to model skin-color, some embodiments of the present invention compute integral images of normalized color channels nr=R/R+G+B and nb=B/R+G+B, where R, G, B correspond to the red, green, and blue channels of the input image. Provided that skin pixels of humans from different races differ mostly in intensity rather than color, operating in normalized intensity spaces is important to handle this variability. Two integral skin-color filters of the present invention are defined as follows:

Skin-Color Filter A $$F^{nr}(x^{nr}; I^{nr}) = \sum_k^N x_k^{for} / N \qquad \text{Equation 5}$$

Skin-Color Filter B $$F^{nb}(x^{nb}; I^{nb}) = \sum_k^N x_k^{nb} / N \qquad \text{Equation 6}$$

The skin-color filters are useful to remove false face detections that do not contain a sufficient amount of skin pixels.

Some embodiments of the present invention compute the integral image of pixel intensities $I^{int}$ and square values $I^{sq}$ (for example, in normalized R/R+G+B channel 670, see FIG. 6B, discussed above) for fast computation of the variance of pixel intensities along the face region. One variance filter of the present invention is defined as follows:

Variance Filter $$F^{var}(x^{int}; I^{int,sq}) = \sum_k^N (x_k^{int})^2 / N - \left(\sum_k^N x_k^{int} / N\right)^2 \qquad \text{Equation 7}$$

In Equation 7, the first term can be rapidly computed with $I^{sq}$ and the second term with $I^{int}$. The reasoning behind this filter is to quickly remove homogeneous background patches, which are quite frequent in natural images.

In many embodiments, the above-mentioned filters are used to enhance face detection. More specifically, during the sliding window process, for each candidate subwindow, the set of multi-modal integral filters is applied (in step S610, discussed above), and the respective outputs are checked (in step S615, discussed above) to see whether they are within a certain range of values, $\alpha^m < F^i(x^m; I^m) < \beta^m$, for all filters i and all modalities m, where the thresholds am and r are learned from a small validation set. If the filters fail to satisfy this condition, the candidate subwindow is immediately rejected. Otherwise, the subwindow remains for further processing.

Figure 7A:
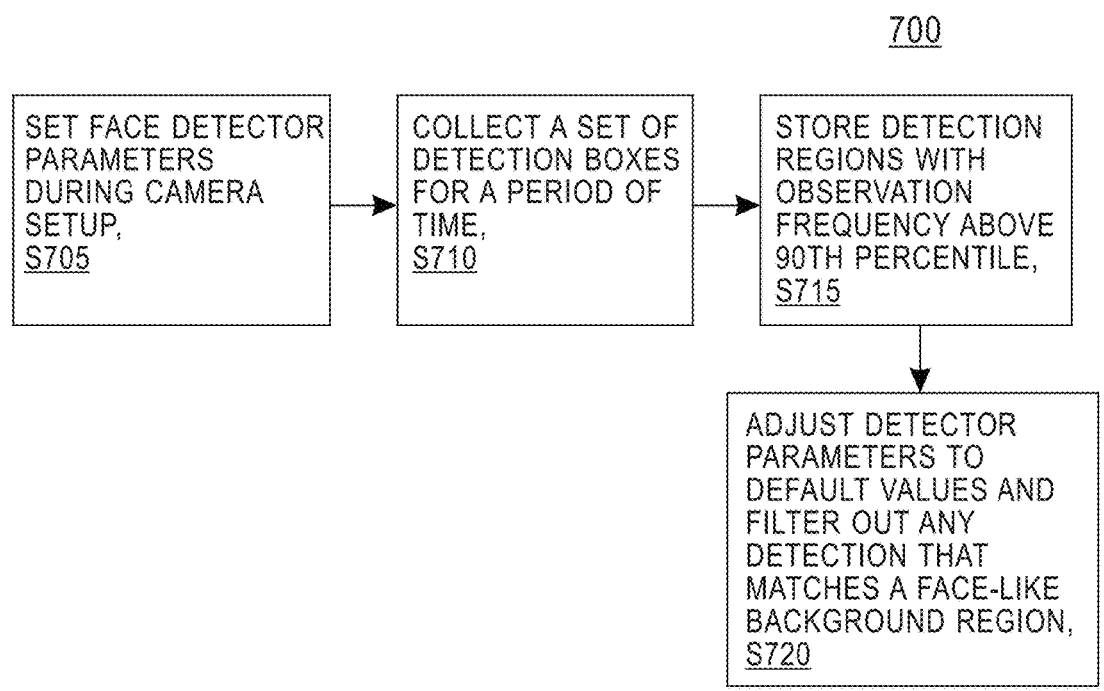
FIG. 7A is a flowchart showing a third embodiment method performed, at least in part, by the second embodiment system.
Figure 7B:
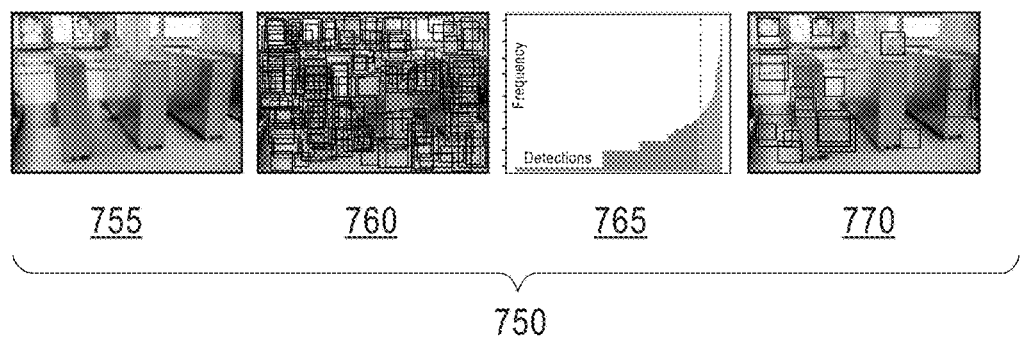
FIG. 7B is a diagram showing information that is generated, at least in part, by the third embodiment method.

Despite the use of background modeling for constraining the search space of face detection in fixed cameras, in many cases cameras can contribute to an increased rate of false alarms due to face-like background patches. Because of sudden lighting changes, shadows, or reflections, regions can be considered as foreground at certain times by a background modeling algorithm, leading to potential false triggers of the face detector. In some cases, this problem becomes even more pronounced when pictures of faces are part of the background, as shown in FIG. 7B (discussed below).

As such, embodiments of the present invention discover face-like regions in the background, so that face detections that match these discovered regions can be suppressed. FIG. 7A shows flowchart 700 depicting a face-like background filtering process for improving accuracy and removing false alarms (face-like regions) from the background of an image. FIG. 7B shows diagram 750 illustrating the face-like background filtering process as applied to an image (image 755). This method and associated diagram will now be discussed, over the course of the following paragraphs, with extensive reference to FIG. 7A (for the method step blocks) and FIG. 7B (for the results of the method steps).

Processing begins with step S705, where, during the camera setup, the filtering process sets the parameters of the face detector to operate: (i) only on background regions; and (ii) at a high-recall rate.

Processing proceeds to step S710, where the filtering process collects a set of detection boxes for a certain period of time (for example, 1000 frames), typically at a high sensitivity detection rate. For each region, detections that fired at the exact same location and scale are recorded. Referring to FIG. 7B, video frame 755 depicts a frame prior to collecting detection boxes, and collected face boxes image 760 depicts the collected set of detection boxes. It should be noted that frame 755 includes pictures of faces—but not actual faces—in the background of the image.

Processing proceeds to step S715, where the filtering process, upon ending the collection period, stores/maintains any detection box with an observation frequency above the $90^{th}$ percentile (depicted by graph 765). These detection boxes are considered to correspond to "face-like" background regions, which are shown in diagram 750 at face-like regions image 770 (see FIG. 7B).

Processing proceeds to step S720, where the filtering process adjusts the detector parameters back to their default values and filters out any detections that match a face-like background region. Even though occasionally a real face may match the exact same position and scale of a face-like background region, this is not typically a problem, as usually the face would also be captured in previous or subsequent frames.

Once the multimodal integral filtering (discussed above in relation to FIGS. 6A and 6B) and face-like background filtering (discussed above in relation to FIGS. 7A and 7B) have been applied, detection is performed on the filtered results. A well-known discriminative detector may be used to detect the objects/faces for post-processing.

In many post-processing situations, a standard procedure, called non-maximum suppression (NMS) is performed after object detection to reduce false positives due to multiple firing from the same object. Typically, NMS removes lower confidence detections which overlap too much with the locally highest confidence detection. However, when a scene is too crowded, this process is no longer effective. Some suppression needs to occur, but simple NMS eliminates some of the true detections of nearby objects.

Typical machine-learning based object detection uses a sliding window approach to detect objects at all scales and all positions from an image. A true positive object in the image will fire multiple times in nearby locations. NMS is usually performed to remove the spurious detections and only keep the one with the highest confidence in a local neighborhood.

A primary problem with standard approaches to NMS occurs when objects in the scene are in very close proximity or are occluding each other. This problem can be partially alleviated by looking for more than one local maximum in a region of overlapping detections. However, in practice, there is not typically enough information to know at what scale further local maxima should be filtered or not. The problem is compounded by the fact that neighboring occluded pedestrians will have lower confidence because they are occluded. To resolve this issue, embodiments of the present invention use temporal information to successively augment NMS and capture nearby objects which might otherwise be suppressed. Temporal information also serves to corroborate a low confidence detection or retain a detection which is no longer detected. Similarly, temporal information can be used to exclude detections with low confidence and little temporal support. This class of techniques that use temporal information to enhance conventional NMS is further referred to herein as "temporal non-maximum suppression" (or "tNMS").

In an embodiment of the present invention, detections on each frame are collected without performing NMS. After n frames have been collected, NMS is performed. For successive frames, all the detections prior to NMS for the current frame are retained, as are all of the detections for the most recent n−1 frames.

Diagram 800 (see FIG. 8) illustrates how a raw detector will detect many bounding boxes around each person in a scene, and how the present invention reduces the bounding boxes to a single box per person. More specifically, image 810 depicts an original image including two people, and image 820 depicts the bounding boxes detected by the unfiltered process. Embodiments in accordance with the present invention look for dominant detections in each set of overlapping detections and suppress all others, resulting in image 830, which depicts single bounding boxes surrounding each person. By collecting a plurality of detections per frame over a period of time and performing NMS on "n" frames of collected detections, spatial coherence is maintained and accuracy is improved. As a result, embodiments of the present invention: (i) correctly filter detections that correspond to an actual person; and (ii) only output a single detection per person.

Figure 9:
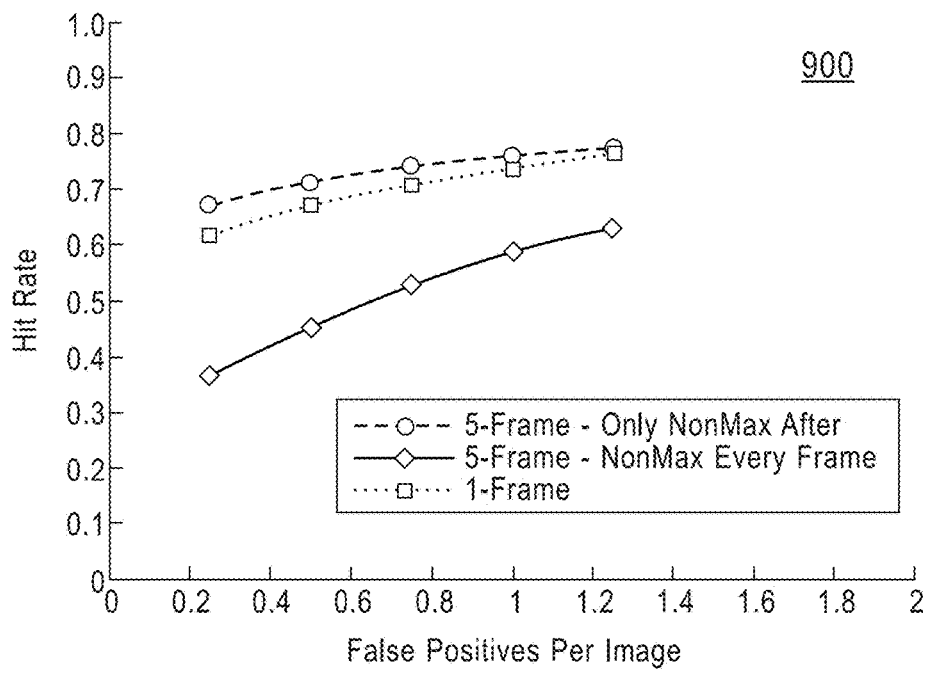
FIG. 9 is a graph showing information that is helpful in understanding the third embodiment system.

Graph 900 (see FIG. 9) depicts the improved results provided by NMS in an embodiment of the present invention (for example, the embodiment depicted in diagram 800). In FIG. 9: (i) "1-Frame" (the middle curve) represents applying the standard pairwise maxima NMS on each frame; (ii) "5-Frame—NonMax Every Frame" (the lowest curve) represents combining detections after NMS has been performed on every frame, and then performing NMS again; and (iii) "5-Frame—Only NonMax After" (the highest curve) represents NMS being performed in post-processing, after five frames have been collected, without NMS being performed on each frame individually. As shown in FIG. 9, by filtering on a collection of several (in this case, five) frames, instead of filtering for every frame, embodiments of the present invention are able to better detect patterns of objects present in the image (as shown by the higher hit rate).

Figure 8:
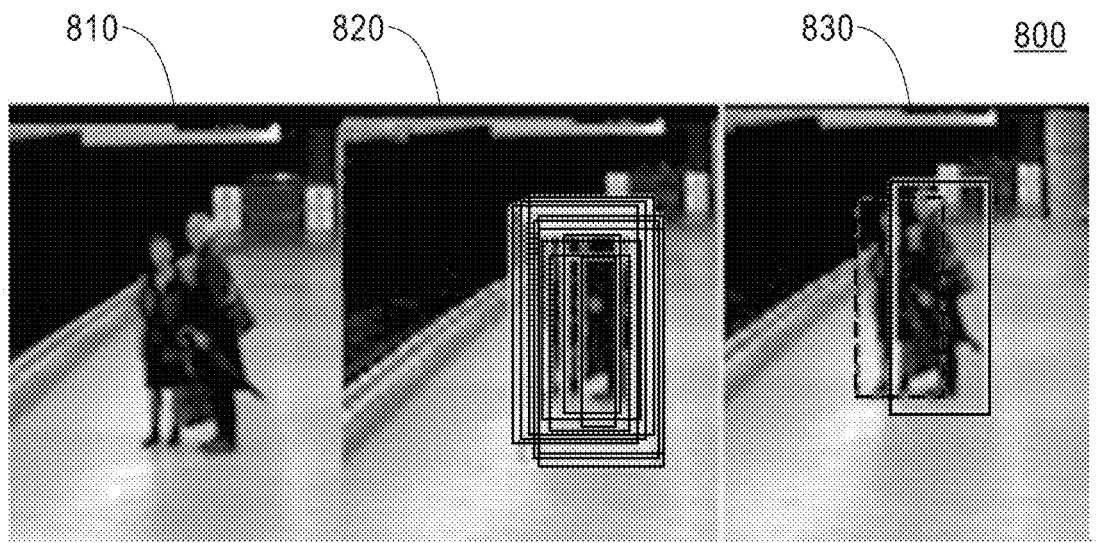
FIG. 8 is a diagram showing information generated, at least in part, by a third embodiment system according to the present invention.
Figure 10:
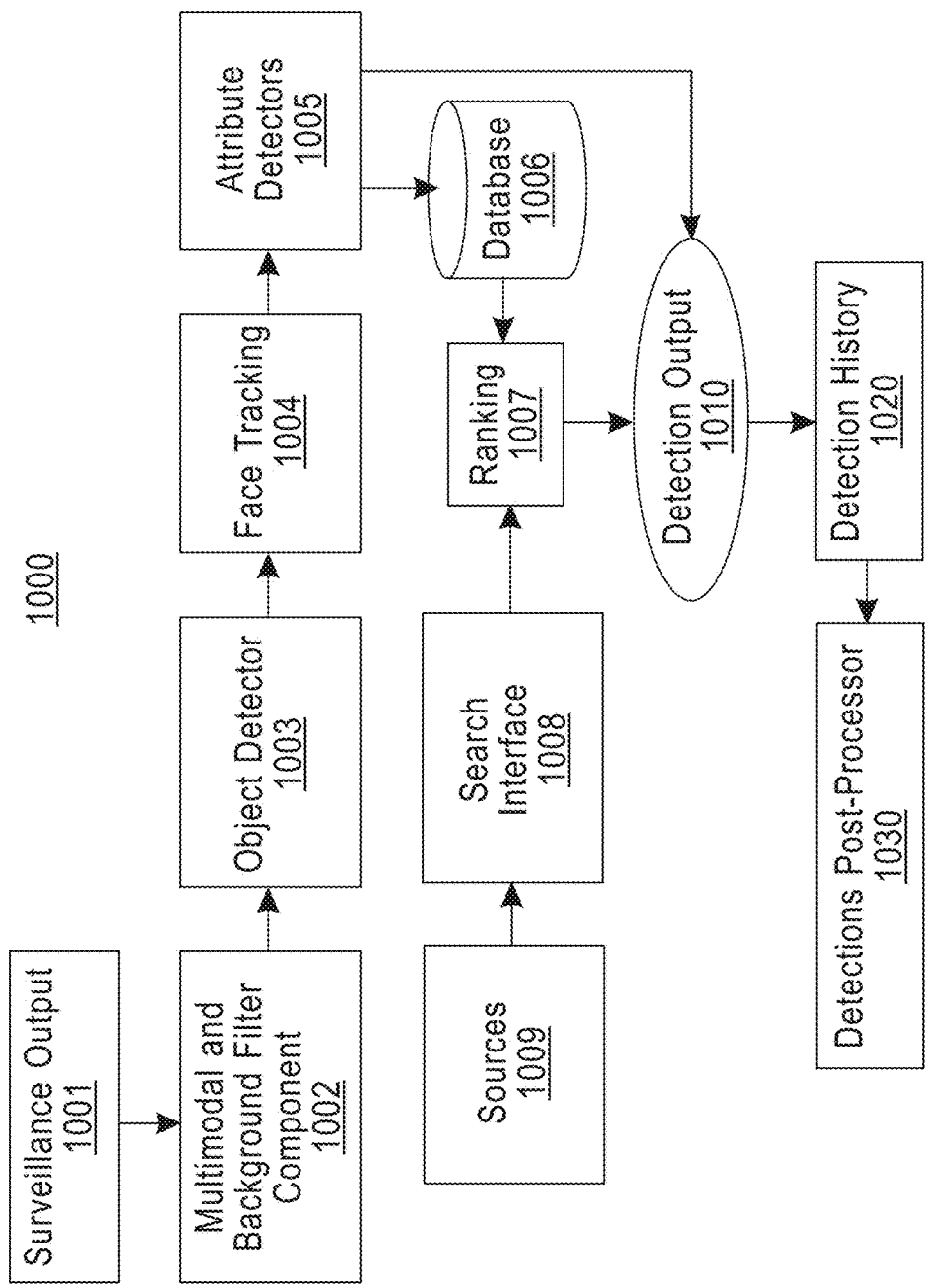
FIG. 10 is a block diagram view of a fourth embodiment system according to the present invention.

FIG. 10 illustrates a system for performing some of the foregoing pre-processing and post-processing of surveillance output. Surveillance output 1001 is provided for preprocessing including filtering by multimodal filters and background filtering 1002 (such as the filtering discussed above in relation to FIGS. 6A, 6B, 7A, and 7B). Object (or face) detector 1003 detects objects. Optional face tracker 1004 may be utilized to track faces. Attribute Detector 1005 may be used to detect attributes. Detection output may be stored at a database 1006 for additional processing. Ranking component 1007 can rank detection output against predetermined thresholds or against known images obtained by a search interface 1008 from sources 1009. Detection output 1010 can also be processed by collecting detections across frames in a detection history 1020 and applying NMS to "n" frames of detections at Detections Post-processor 1030 (as depicted in FIGS. 8 and 9).

In some embodiments according to the present invention, a method for detecting objects in surveillance output is provided, including the following steps: (i) applying a plurality of multimodal integral filters to portions of input images to remove portions of said images and retain remaining candidate portions; and (ii) performing detection on remaining candidate portions to generate detection output. In some embodiments, the image portions include windows selected by applying a sliding window approach. In some embodiments, the method for detecting objects also includes performing face-like background filtering.

In some embodiments, the applying of multimodal integral filters includes computing integral images for modalities including: (i) integral images of normalized R/R+G+B and B/R+G+B in order to represent skin color, (ii) an integral image of background subtraction (BGS) around the face; (iii) an integral image of BGS around the torso as contextual BGS; and (iv) an integral image of squared intensities for fast computation of standard deviation.

In some embodiments, the method for detecting objects further includes, for each modality, leveraging the integral image to compute measures comprising an average of pixels of a modality at a face bounding box or torso bounding box and a standard deviation of the face and torso bounding boxes, as filter responses. Some of these embodiments also include comparing the filter responses with thresholds to quickly remove hypotheses and false alarms.

Some embodiments of the present invention include processing the detection output by performing the following steps: (i) collecting a plurality of detections per frame over a period of time; (ii) assembling the plurality of "n" detections for a frame; and (iii) applying non-maximum suppression (NMS) once "n" frames of collected detections are assembled.

Some embodiments further include, for successive frames, retaining all detections prior to NMS for the current frame and all detections for the most recent n−1 frames. Some embodiments also include, for each frame, discarding detections older than n frames (or any set of frames, before or after the current frame).

Some embodiments of the present invention include a method to filter object detection output from a sliding window approach to hypothesis generation for surveillance output, where the method includes the steps of: (i) collecting detections using a sliding window approach; (ii) assembling collections of detections across frames into a detection history; (iii) at each frame, removing detections older than n frames from the detection history; and (iv) performing non-maximum suppression (NMS) after n frames of detections have been collected.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Surveillance output: any video image(s) or series of successive still images collected by a surveillance system; devices that may be used by a surveillance system to collect surveillance output include, but are not limited to: stationary cameras; mobile/moveable cameras; smart (and/or camera) phones; computers (see definition, above); and/or computer-readable storage media, for example.

Object detection: the process of finding and/or identifying an object in a digital image and/or video; examples of types of objects that are detectable via object detection include, but are not limited to: (i) animate objects such as humans (or people), human features (such as faces and/or facial characteristics), animals, and/or vegetation (or plants); (ii) inanimate objects such as buildings, vehicles, devices (including, for example, computers), and/or furniture; and/or (iii) combinations of animate and inanimate objects, such as landscapes, cityscapes, and/or geographic features.

What is claimed is:

1. A method comprising:
   receiving a set of images;
   filtering the set of images using a set of integral filters, resulting in a filtered set of images; and
   performing machine-learning based object detection on the filtered set of images to generate a set of object-detected images,
   wherein filtering the set of images using the set of integral filters includes:
   determining a candidate image region of an image of the set of images, wherein the candidate image region corresponds to a particular modality, wherein the particular modality includes one of: (i) color channels, (ii) contextual background selection, and (iii) pixel intensities, for the image of the set of images, computing an integral image based on the particular modality, computing integral image output, including at least an average of pixels of the particular modality, utilizing the computed integral image, and based, at least in part, on the computed integral image output, removing the candidate image region from the image, wherein the image no longer includes the candidate image region.

2. The method of claim 1, wherein the set of images includes surveillance output collected over a period of time from one or more surveillance devices.

3. The method of claim 1, wherein the machine-learning based object detection is performed by a face detector, and wherein the method further comprises:

performing face-like background filtering on the filtered set of images, wherein performing the face-like background filtering on the filtered set of images includes:

running the face detector at a sensitive threshold on background regions of filtered images of the filtered set of images, the background regions detected by background modeling, recording a number of face detections for candidate regions within the background regions over a period of time, and in response to determining that the number of face detections for a candidate region exceeds a threshold, discarding the candidate region when using the face detector to perform machine-learning based object detection.

4. The method of claim 1, further comprising:

assembling a first plurality of object-detected images from the set of object-detected images; and performing non-maximum suppression on the assembled first plurality of object-detected images, wherein the non-maximum suppression is performed on the images of the assembled first plurality of object-detected images simultaneously as a group.

5. A computer program product comprising a computer readable storage medium having stored thereon:

program instructions programmed to receive a set of images;

program instructions programmed to filter the set of images using a set of integral filters, resulting in a filtered set of images; and program instructions programmed to perform machine-learning based object detection on the filtered set of images to generate a set of object-detected images, wherein filtering the set of images using the set of integral filters includes:

determining a candidate image region of an image of the set of images, wherein the candidate image region corresponds to a particular modality, wherein the particular modality includes one of: (i) color channels, (ii) contextual background selection, and (iii) pixel intensities, for the image of the set of images, computing an integral image based on the particular modality, computing integral image output, including at least an average of pixels of the particular modality, utilizing the computed integral image, and based, at least in part, on the computed integral image output, removing the candidate image region from the image, wherein the image no longer includes the candidate image region.

6. The computer program product of claim 5, wherein the set of images includes surveillance output collected over a period of time from one or more surveillance devices.

7. The computer program product of claim 5, wherein the machine-learning based object detection is performed by a face detector, and wherein the computer program product further comprises:

program instructions programmed to perform face-like background filtering on the filtered set of images, wherein performing the face-like background filtering on the filtered set of images includes:

running the face detector at a sensitive threshold on background regions of filtered images of the filtered set of images, the background regions detected by background modeling, recording a number of face detections for candidate regions within the background regions over a period of time, and in response to determining that the number of face detections for a candidate region exceeds a threshold, discarding the candidate region when using the face detector to perform machine-learning based object detection.

8. The computer program product of claim 5, further comprising:

program instructions programmed to assemble a first plurality of object-detected images from the set of object-detected images; and program instructions programmed to perform non-maximum suppression on the assembled first plurality of object-detected images, wherein the non-maximum suppression is performed on the images of the assembled first plurality of object-detected images simultaneously as a group.

9. The computer program product of claim 8, further comprising:

program instructions programmed to assemble a second plurality of object-detected images from the set of object-detected images, where the second plurality of object-detected images includes at least one object-detected image from the first plurality of object-detected images and at least one object-detected image that is not included in the first plurality of object-detected images; and program instructions programmed to perform non-maximum suppression on the assembled second plurality of object-detected images, wherein the non-maximum suppression is performed on the images of the assembled second plurality of object-detected images simultaneously as a group.

10. A computer system comprising:

one or more processors; and a computer readable storage medium;

wherein:

the one or more processors are programmed to run program instructions stored on the computer readable storage medium; and the program instructions include:

program instructions programmed to receive a set of images;

program instructions programmed to filter the set of images using a set of integral filters, resulting in a filtered set of images; and program instructions programmed to perform machine-learning based object detection on the filtered set of images to generate a set of object-detected images, wherein filtering the set of images using the set of integral filters includes:

determining a candidate image region of an image of the set of images, wherein the candidate image region corresponds to a particular modality, wherein the particular modality includes one of: (i) color channels, (ii) contextual background selection, and (iii) pixel intensities, for the image of the set of images, computing an integral image based on the particular modality, computing integral image output, including at least an average of pixels of the particular modality, utilizing the computed integral image, and based, at least in part, on the computed integral image output, removing the candidate image region from the image, wherein the image no longer includes the candidate image region.

11. The computer system of claim 10, wherein the set of images includes surveillance output collected over a period of time from one or more surveillance devices.

12. The computer system of claim 10, wherein the machine-learning based object detection is performed by a face detector, and wherein the computer program product further comprises:

program instructions programmed to perform face-like background filtering on the filtered set of images, wherein performing the face-like background filtering on the filtered set of images includes:

running the face detector at a sensitive threshold on background regions of filtered images of the filtered set of images, the background regions detected by background modeling, recording a number of face detections for candidate regions within the background regions over a period of time, and in response to determining that the number of face detections for a candidate region exceeds a threshold, discarding the candidate region when using the face detector to perform machine-learning based object detection.

13. The computer system of claim 10, further comprising:

program instructions programmed to assemble a first plurality of object-detected images from the set of object-detected images; and program instructions programmed to, perform non-maximum suppression on the assembled first plurality of object-detected images, wherein the non-maximum suppression is performed on the images of the assembled first plurality of object-detected images simultaneously as a group.

14. The computer system of claim 13, further comprising:

program instructions programmed to assemble a second plurality of object-detected images from the set of object-detected images, where the second plurality of object-detected images includes at least one object-detected image from the first plurality of object-detected images and at least one object-detected image that is not included in the first plurality of object-detected images; and program instructions programmed to perform non-maximum suppression on the assembled second plurality of object-detected images, wherein the non-maximum suppression is performed on the images of the assembled second plurality of object-detected images simultaneously as a group.

15. The method of claim 1, wherein:

the particular modality includes color channels, and the integral image output does not indicate the presence of a sufficient amount of skin pixels to meet the one or more thresholds.

16. The method of claim 1, wherein:

the candidate image region includes background features, determined via contextual background selection, and the integral image output does not indicate the presence of a sufficient amount of foreground pixels to meet the one or more thresholds.

17. The method of claim 1, wherein:

the particular modality includes pixel intensities, and the integral image output does not indicate the presence of a sufficient amount of pixel variance to meet the one or more thresholds.

18. The method of claim 1, wherein performing the machine-learning based object detection includes performing discriminative object detection.

19. The method of claim 1, wherein the machine-learning based object detection is performed using a sliding window approach.

* * * * *